S. G. SUPPLEE.
DENTURE ATTACHING DEVICE.
APPLICATION FILED DEC. 24, 1918.
1,324,476.
Patented Dec. 9, 1919.
2 SHEETS—SHEET 1.
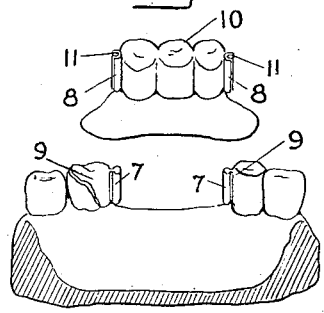
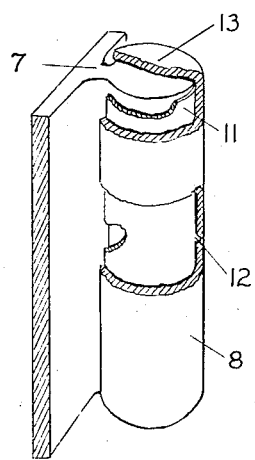
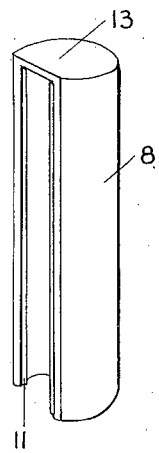
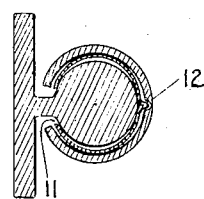
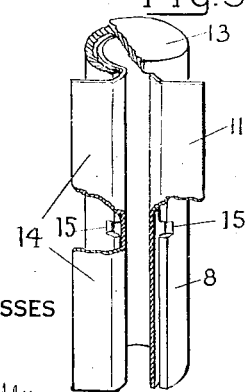
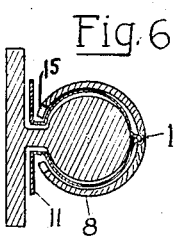
WITNESSES
INVENTOR
S. G. Supplee
BY
Mitchell Allyn
ATTORNEY

S. G. SUPPLEE.
DENTURE ATTACHING DEVICE.
APPLICATION FILED DEC. 24, 1918.

1,324,476.

Patented Dec. 9, 1919.
2 SHEETS—SHEET 2.

WITNESSES

INVENTOR
S. G. Supplee,
BY
ATTORNEY

UNITED STATES PATENT OFFICE.

SAMUEL G. SUPPLEE, OF NEW YORK, N. Y.

DENTURE-ATTACHING DEVICE.

1,324,476.  Specification of Letters Patent.  Patented Dec. 9, 1919.

Application filed December 24, 1918. Serial No. 268,130.

*To all whom it may concern:*

Be it known that I, SAMUEL G. SUPPLEE, a citizen of the United States of America, residing at New York, N. Y., have invented a new and useful Denture-Attaching Device, of which the following is a specification.

My present invention relates to means for supporting and securing removable dentures.

The objects of the invention are to provide simple and effective denture supporting means adapted to hold the denture firmly in place and at the same time arranged to permit of lateral motion and ready removal of the denture when that is desired.

Further objects are to provide denture supporting means which will be sanitary and easily kept clean and which will be capable of adjustment for the purpose of taking up wear and securing the proper fit of the denture.

With the foregoing and other objects in view my invention resides in the combination with the telescopic post or bar and sleeve elements forming the engaging members of a denture supporting device, of a friction holding element in the nature of an intermediate spring lining interposed between the post or bar and sleeve members for causing a gripping engagement therebetween. This intermediate holding element is preferably adjustable independently of the two members between which it is interposed and which are usually relatively rigid, for the purpose of taking up wear and bringing about a proper fit of the two members.

Other features and details of construction will appear as the specification proceeds.

In the drawings accompanying this specification I have illustrated the invention embodied in several different forms and would have it understood that the invention is capable of further modification without departure from the true spirit and scope of the invention.

In said drawings:—

Figure 1, is a fragmentary view illustrating the application of my invention to a denture of typical construction.

Fig. 2, is an enlarged view of the attaching device partly broken away and shown in section.

Fig. 3, is a detached view of the sleeve member of the device.

Fig. 4, is a cross sectional view taken substantially on the plane of the line 4—4 of Fig. 2.

Fig. 5, is a cross sectional view of a slightly modified form of the invention.

Fig. 6, is a detail view of the sleeve member of this form of the device.

Figure 8:
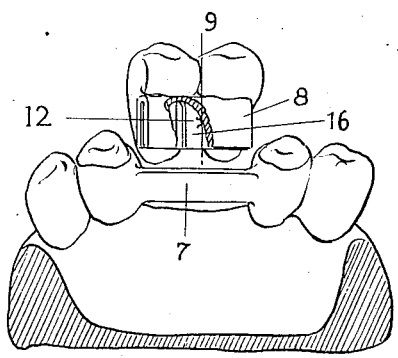
Figs. 7, 8 and 9 are illustrations of further modifications of the invention.

The attaching device consists in the main of two interlocking parts, the post member 7 and a sleeve member 8 engageable telescopically thereover.

The customary method of using the device is to secure the so-called post members to the stationary abutments such as indicated at 9 in Fig. 1 and to secure the co-operating sleeve members to the removable denture 10.

A relatively firm, but at the same time readily disengageable gripping contact between the sleeve and supporting post, is obtained in my invention by interposing an intermediate gripping element between the opposed surfaces of the post or bar and sleeve. This gripping element is shown in the form of a lining 11 of relatively thin elastic or spring metal seated within the sleeve and secured therein by denting a portion of the same into a depression or socket formed on the inside of the sleeve, as indicated at 12.

The intermediate gripping member is, as shown, usually constructed of light spring metal which can be "sprung" one way or the other, more or less, to bring about a proper gripping engagement between the two members. This adjustment is further facilitated by reason of the fact that the sleeve member, especially when it is mounted, is relatively rigid to support the spring from being over strained but may be adjusted to limit the opening of the spring under lateral strain. This permits adjustment of the spring lining by simply inserting the edge of the knife for instance, between the relatively rigid outer shell and the exposed edges of the lining. The adjustment of the lining in such a way is illustrated in a somewhat exaggerated degree in Fig. 4 where it will be seen that the edges of the lining have been sprung inward so as to frictionally grip the post with a spring force.

In some instances, the end of the tube is closed by a cap 13, which further assists in positioning the intermediate gripping element.

In some instances it may be advisable to bring the edges of the spring lining element out over the edges at the open side of the sleeve. Such a construction is illustrated in Figs. 5 and 6 wherein the lining is shown as formed with extended edges 14 brought out over the edges of the sleeve and making frictional engagement with the post. The edges of the sleeve are in this case also shown notched as indicated at 15 to provide a convenient grip for pincers or the like, used in handling the device. In some instances the relatively rigid outer casing may be slightly deformed for the purpose of taking up wear or adjusting to other conditions and these notches provide a convenient hold for accomplishing such adjustments.

Figure 9:
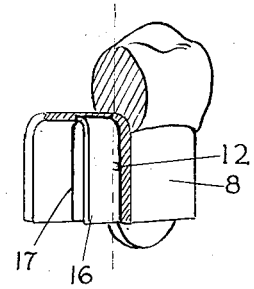
Figure 7:
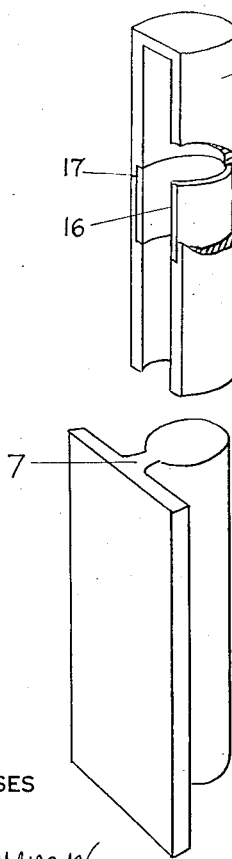

In the forms of the invention shown in Figs. 7, 8 and 9 the yielding gripping element which is interposed between the complementary members is in the form of a band 16 of spring material extending less than the full length of the sleeve member and seated in a depression 17 in the inner wall of the sleeve.

The first of the two forms last described, is like the preceding forms in that the sleeve element slips endwise over the post member. In the construction shown in Fig. 8, however, the so-called sleeve member engages edgewise over the post or supporting member. The spring gripping elements in the last two forms described are preferably located substantially midway between the ends of the sleeve and can be adjusted to take up wear, etc., in the same manner as before described.

I claim:—

1. Attaching means for removable dentures, comprising a bar member, a sleeve member engageable over the bar member and a spring lining within the sleeve member and carried thereby for frictionally gripping the bar member.

2. Attaching means for removable dentures, comprising relatively rigid coöperating post and sleeve members and a relatively resilient lining interposed between said two members and adjustable independently thereof.

3. Attaching means for removable dentures, comprising a post, a sleeve engageable over said post and open along one side thereof and a lining interposed between the post and sleeve and having its edges exposed at the edges of the open side of the sleeve.

4. A combination like that described in claim 3 wherein the edge of the lining is brought out over the edge of the sleeve.

5. Attaching means for removable dentures, comprising a post, a sleeve engageable over said post and open along one side, said sleeve having notches in the edges thereof at opposite sides of the opening therein and a spring lining within said sleeve and engageable with said notches.

6. Attaching means for removable dentures, comprising a post member, a sleeve member engageable over said post member and a spring gripping member interposed between said post and sleeve members and embracing the post member, said sleeve member having a recess formed in the inner wall thereof in which a portion of said spring gripping member is seated.

SAMUEL G. SUPPLEE.